US009406298B2

(12) United States Patent
Cumani et al.

(10) Patent No.: US 9,406,298 B2
(45) Date of Patent: Aug. 2, 2016

(54) METHOD AND APPARATUS FOR EFFICIENT I-VECTOR EXTRACTION

(71) Applicant: Nuance Communications, Inc., Burlington, MA (US)

(72) Inventors: Sandro Cumani, Turin (IT); Pietro Laface, Turin (IT)

(73) Assignee: Nuance Communications, Inc., Burlington, MA (US)

( * ) Notice: Subject to any disclaimer, the term of this patent is extended or adjusted under 35 U.S.C. 154(b) by 337 days.

(21) Appl. No.: 13/856,992

(22) Filed: Apr. 4, 2013

(65) Prior Publication Data

US 2014/0222428 A1 Aug. 7, 2014

Related U.S. Application Data

(63) Continuation-in-part of application No. 13/762,213, filed on Feb. 7, 2013, now abandoned.

(51) Int. Cl.
*G10L 17/00* (2013.01)
*G10L 17/02* (2013.01)

(52) U.S. Cl.
CPC ..................................... *G10L 17/02* (2013.01)

(58) Field of Classification Search
CPC ....................................................... G10L 17/00
See application file for complete search history.

(56) References Cited

U.S. PATENT DOCUMENTS 5,864,810 A * 1/1999 Digalakis et al. ............. 704/255
6,697,778 B1 * 2/2004 Kuhn et al. .................... 704/243

(Continued)

FOREIGN PATENT DOCUMENTS

EP 2770502 A1 8/2014
EP 2806425 A2 11/2014
(Continued)

OTHER PUBLICATIONS

Cumani, S., et al., "Fast Discriminative Speaker Verification in the I-Vector Space," in *Proceedings of ICASSP 2011*, pp. 4852-4855 (2011).

(Continued)

*Primary Examiner* — Vincent Rudolph
*Assistant Examiner* — Richa Mishra
(74) *Attorney, Agent, or Firm* — Hamilton, Brook, Smith & Reynolds, P.C.

(57) ABSTRACT

Most speaker recognition systems use i-vectors which are compact representations of speaker voice characteristics. Typical i-vector extraction procedures are complex in terms of computations and memory usage. According to an embodiment, a method and corresponding apparatus for speaker identification, comprise determining a representation for each component of a variability operator, representing statistical inter- and intra-speaker variability of voice features with respect to a background statistical model, in terms of a linear operator common to all components of the variability operator and having a first dimension larger than a second dimension of the components of the variability operator; computing statistical voice characteristics of a particular speaker using the determined representations; and employing the statistical voice characteristics of the particular speaker in performing speaker recognition. Computing the voice characteristics, by using the determined representations, results in significant reduction in memory usage and possible increase in execution speed.

20 Claims, 4 Drawing Sheets

(56) References Cited

U.S. PATENT DOCUMENTS

| | | |
|---|---|---|
| 7,299,177 B2 | 11/2007 | Broman et al. |
| 9,258,425 B2 | 2/2016 | Krause |
| 2003/0108160 A1 | 6/2003 | Brown et al. |
| 2007/0043565 A1 | 2/2007 | Aggarwal et al. |
| 2008/0205624 A1 | 8/2008 | Mandalia et al. |
| 2010/0278317 A1 | 11/2010 | Broman et al. |
| 2011/0004475 A1* | 1/2011 | Bellegarda .................... 704/251 |
| 2011/0040561 A1* | 2/2011 | Vair et al. ...................... 704/240 |
| 2011/0119060 A1 | 5/2011 | Aronowitz |
| 2012/0263285 A1 | 10/2012 | Rajakumar et al. |
| 2014/0222423 A1 | 8/2014 | Cumani et al. |
| 2014/0244257 A1 | 8/2014 | Colibro et al. |
| 2014/0348308 A1 | 11/2014 | Krause et al. |

FOREIGN PATENT DOCUMENTS

| | | |
|---|---|---|
| WO | WO 2006/126183 A2 | 11/2006 |
| WO | WO 2013/124455 A1 | 8/2013 |

OTHER PUBLICATIONS

Glembek, O., et al., "Simplification and Optimization of I-Vector Extraction," in *Proceedings of ICASSP 2011*, pp. 4516-4519 (2011).

Aronowitz, H. and Barkan, O., "Efficient Approximated I-Vector Extraction," in *Proceedings of ICASSP 2012*, pp. 4789-4792 (2012).

Kenny, P., "A Small Footprint i-Vector Extractor," in *Proceedings of Odyssey 2012*, pp. 1-6 (2012).

Cumani, S., et al., "Memory and computation effective approaches for i-vector extraction," in *Proceedings of Odyssey 2012*, pp. 7-13 (2012).

Kenny, P., "Joint Factor Analysis of Speaker and Session Variability: Theory and Algorithms," 2005. Technical report CRIM-06/08-13.

Yin, Shou-Chun, et al., "A Joint Factor Analysis Approach to Progressive Model Adaptation in Text-Independent Speaker Verification", IEEE Transaction on Audio, Speech, and Language Processing. vol. 15, No. 7, pp. 1999-2010, (Sep. 2007).

Notice of Abandonment for U.S. Appl. No. 13/762,213, mailed Dec. 10, 2015.

* cited by examiner

| System | Memory (MB) | 1 core, 1000 utterances | | 12 cores, 5000 utterances | | LDA WCCN | | | PLDA | |
|---|---|---|---|---|---|---|---|---|---|---|
| | | cpu time | time ratio | cpu time | time ratio | EER (%) | min DCF8 | min DCF10 | min DCF8 | min DCF10 |
| Fast baseline | 815 | 174 | 4.70 | 184 | 8.76 | 5.00 | 229 | 614 | 3.59 EER / 181 | 566 |
| Slow baseline | 188 | 2462 | 66.54 | 2020 | 96.19 | 5.00 | 229 | 614 | 3.59 / 181 | 566 |
| VB10-10 | 205 | 385 | 10.4 | 267 | 12.71 | 4.94 | 230 | 619 | 3.57 / 181 | 570 |
| VB20-10 | 221 | 338 | 9.14 | 249 | 11.86 | 4.94 | 229 | 621 | 3.51 / 182 | 569 |
| VB10-100 | 205 | 228 | 6.16 | 147 | 7.00 | 5.16 | 233 | 627 | 3.59 / 184 | 587 |
| VB20-100 | 221 | 195 | 5.27 | 147 | 7.00 | 5.16 | 232 | 622 | 3.53 / 183 | 572 |
| Eigen-decomposition | 191 | 37 | 1.00 | 21 | 1.00 | 5.70 | 252 | 692 | 4.27 / 201 | 692 |
| FSE-2k-10 No Prec. | 32.1 | 28 | 0.76 | 17 | 0.81 | 5.51 | 250 | 640 | 3.70 / 191 | 575 |
| FSE-2k-100 No Prec. | 32.1 | 21 | 0.57 | 15 | 0.71 | 5.91 | 268 | 667 | 4.04 / 194 | 581 |
| FSE-2k-10 Diag Prec. | 32.1 | 29 | 0.78 | 21 | 1.00 | 5.53 | 249 | 647 | 3.73 / 191 | 579 |
| FSE-2k-100 Diag Prec. | 32.1 | 24 | 0.65 | 19 | 0.90 | 5.48 | 260 | 688 | 3.86 / 200 | 594 |
| FSE-3.5k-10 No Prec. | 35.1 | 36 | 0.97 | 22 | 1.05 | 5.45 | 248 | 630 | 3.76 / 195 | 551 |
| FSE-3.5k-100 No Prec. | 35.1 | 25 | 0.68 | 18 | 0.86 | 5.54 | 261 | 656 | 4.08 / 201 | 588 |
| FSE-3.5k-10 Diag Prec. | 35.1 | 34 | 0.92 | 25 | 1.19 | 5.43 | 248 | 631 | 3.73 / 196 | 545 |
| FSE-3.5k-100 Diag Prec. | 35.1 | 28 | 0.76 | 22 | 1.05 | 5.57 | 259 | 661 | 3.91 / 200 | 572 |
| FSE-5k-10 No Prec. | 38 | 43 | 1.16 | 28 | 1.33 | 5.32 | 240 | 641 | 3.49 / 185 | 580 |
| FSE-5k-100 No Prec. | 38 | 29 | 0.78 | 22 | 1.05 | 5.38 | 254 | 653 | 3.69 / 191 | 606 |
| FSE-5k-10 Diag Prec. | 38 | 40 | 1.08 | 30 | 1.43 | 5.29 | 240 | 646 | 3.43 / 185 | 582 |
| FSE-5k-100 Diag Prec. | 38 | 31 | 0.84 | 26 | 1.24 | 5.40 | 254 | 669 | 3.61 / 188 | 605 |
| FSE 10k 10 No Prec. | 48 | 85 | 2.30 | 50 | 2.38 | 5.46 | 238 | 636 | 3.56 / 185 | 584 |
| FSE 10k-100 No Prec. | 48 | 53 | 1.43 | 35 | 1.67 | 5.19 | 240 | 622 | 3.76 / 190 | 589 |
| FSE 10k 10 Diag Prec. | 48 | 68 | 1.84 | 46 | 2.19 | 5.48 | 238 | 639 | 3.56 / 184 | 578 |
| FSE-10k-100 Diag Prec. | 48 | 49 | 1.32 | 36 | 1.71 | 5.42 | 247 | 642 | 3.73 / 190 | 599 |

FIG. 4

METHOD AND APPARATUS FOR EFFICIENT I-VECTOR EXTRACTION

RELATED APPLICATION(S)

This application is a continuation-in-part of U.S. application Ser. No. 13/762,213, filed Feb. 7, 2013. The entire teachings of the above application is incorporated herein by reference.

BACKGROUND

Advances in speech processing techniques have led to a variety of emerging voice or speech-based applications. In particular, significant improvements have been achieved in speaker recognition technology. Such improvements have led to wide use of speaker identification systems and the use of voice biometrics in user authentication.

SUMMARY

According to at least one embodiment, a computer-implemented method, and a corresponding apparatus of speaker identification, comprises determining a representation for each linear operator of a plurality of linear operators, each linear operator representing variability of statistical voice features with respect to a statistical model component among a plurality of statistical model components, in terms of (i) a first orthogonal operator specific to the respective linear operator of the plurality of linear operators, (ii) a weighting operator specific to the respective linear operator of the plurality of linear operators, and (iii) a second linear operator common to the plurality of linear operators and having a first dimension larger than a second dimension of the plurality of linear operators; computing statistical voice characteristics of a particular speaker using at least the representations corresponding to each of the plurality of linear operators determined; and employing the statistical voice characteristics of the particular speaker to determine whether an input speech signal corresponds to the particular speaker.

According to at least one aspect, each linear operator of the plurality of linear operators is a matrix, each respective first orthogonal operator is an orthogonal matrix, each respective weighting operator is a sparse matrix, and the second linear operator, common to the plurality of linear operators, is a matrix with the corresponding number of rows being larger than the number of columns of each linear operator of the plurality of linear operators. The value of the first dimension of the second linear operator may be selected when determining the representation for each linear operator of the plurality of linear operators. The sparse matrix includes, typically, one non-zero entry per row. The statistical model components may be components of a Gaussian mixture model (GMM). The variability of statistical voice features includes inter-speaker variability and intra-speaker variability.

According to at least one other aspect, the representation for each linear operator of the plurality of linear operators is determined by calculating iteratively the representation, the calculated representation being an approximation of the respective linear operator. Also, computing the statistical voice characteristics of the particular speaker includes solving iteratively for a vector representing the statistical voice characteristics of the particular speaker. Each linear operator of the plurality of linear operators may be a normalized linear operator. For example, the linear operators may be normalized with a-priori statistical parameters.

According to yet another aspect, employing the statistical voice characteristics of the particular speaker to determine whether an input speech signal corresponds to the particular speaker includes extracting statistical voice features from the input speech signal and classifying the statistical features extracted using statistical model components specific to the particular speaker, the statistical model components specific to the particular speaker being computed using the plurality of statistical model components, each of the plurality of linear operators, and statistical voice characteristics of the particular speaker being computed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 is a table illustrating simulation results associated with different approaches for i-vector extraction.

DETAILED DESCRIPTION

A description of example embodiments of the invention follows.

With advances in speech processing techniques and improvements in the computational and storage capacity of a variety of processing devices, voice biometrics are considered in many applications and services as potential tools for identifying or authenticating users. Typical speaker recognition techniques use a compact representation, referred to as an i-vector, of a user's statistical voice characteristics with respect to a statistical background model. However, typical i-vector extraction procedures and systems are usually characterized by large memory usage and exhaustive computational complexity. The relatively high computational cost and the large memory usage both increase the cost, and limit the usage of such speaker recognition systems. In the following, at least one embodiment of efficient i-vector extraction that achieves significant reduction in memory storage and computational complexity is described.

Figure 1:
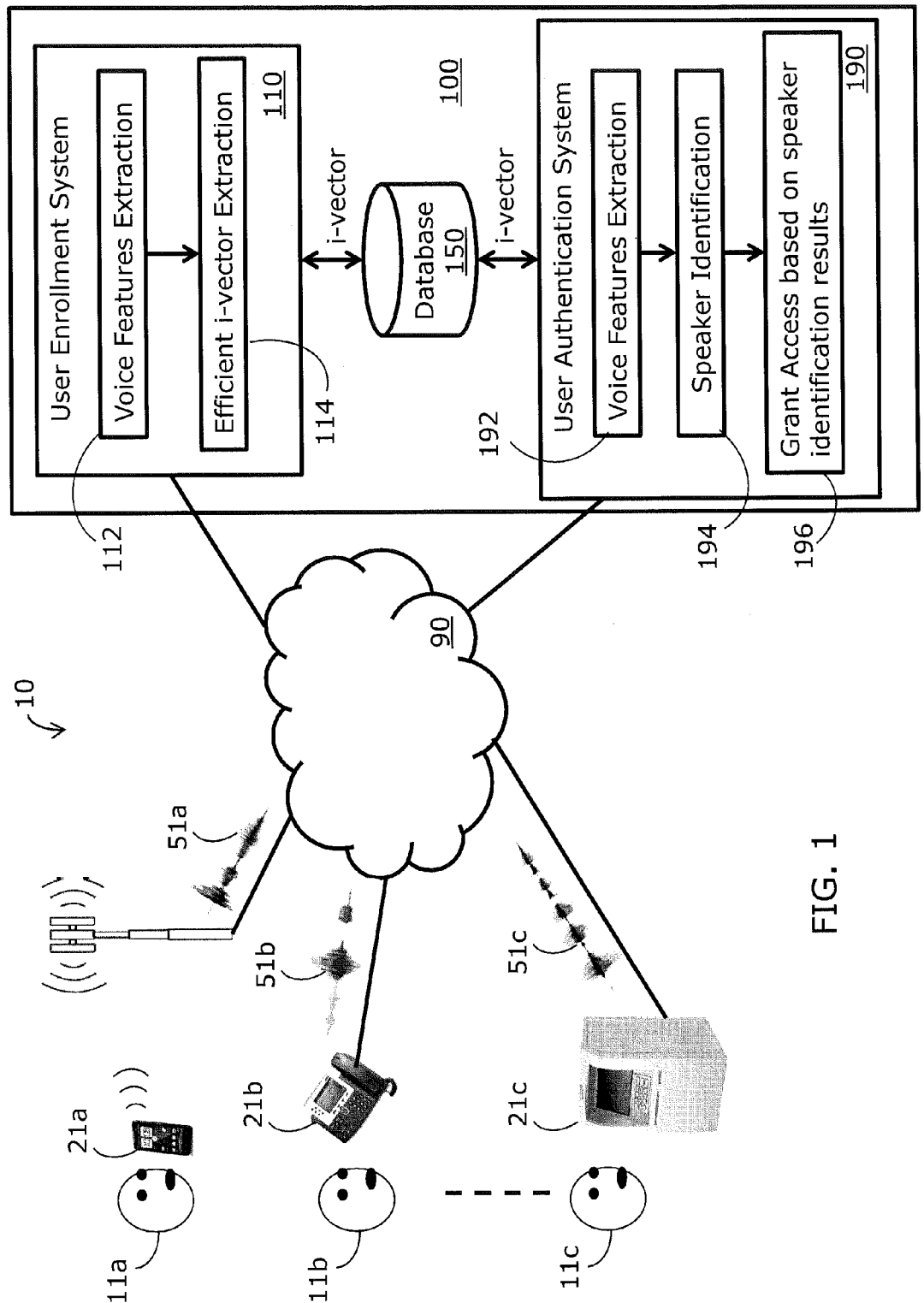
FIG. 1 is a network system illustrating a user service employing speaker authentication based on voice biometrics.

FIG. 1 is a network system 10 illustrating a user service employing speaker authentication based on voice biometrics. The network system 10 includes a communications network 90 coupling network devices 21a, 21b, and 21c, collectively referred to hereinafter as network devices 21 to at least one service center 100. According to at least one aspect, a user, 11a, 11b, or 11c, referred to hereinafter as user 11, connects to the service center 100 using a network device 21, e.g., 21a, 21b, or 21c. The network device 21 may be wire-line telephone device, cell phone, tablet device, personal computer, laptop computer, automated teller machine (ATM) device, television set, or any other electronic device. A voice signal 51a, 51b, or 51c, collectively referred to hereinafter as voice signal 51, of the user 11 is transmitted to the service center 100 through the communications network.

According to at least one aspect, the service center 100 includes a user enrollment system 110, a user authentication system 190, and a database 150. Given a background statistical model, the user enrollment system 110 is configured to determine statistical voice characteristics specific to the individual user 11. According to at least one aspect, statistical voice characteristics specific to the individual user 11 are determined with respect to the background statistical model. The determined statistical voice characteristics specific to the individual user 11 are then stored in the database 150.

The user authentication system 190 is configured to identify the individual user 11, upon subsequent calls to the service center 100, based at least in part on the determined statistical voice characteristics specific to the individual user 11. During a user authentication phase, a voice features extraction module 192 extracts voice feature vectors from a speech signal or segment 51 received from the calling user 11. A speaker identification module 194 then uses stored statistical voice characteristics corresponding to different individual users to determine an identity of the calling user 11. The speaker identification module 194 may further check whether the determined identity of the calling user matches another identity provided by the calling user 11. In determining the identity of the calling user 11, the speaker identification module 194 may employ a classifier using generative models based on Probabilistic Linear Discriminant Analysis (PLDA), a discriminative classifier such as Support Vector Machines (SVM) or Logistic Regression, or any other classifier known in the art. If the identity of the calling user 11, is recognized by the speaker identification module 194, an access control module 196 allows the calling user 11 to access a requested service.

During an adaptation phase, e.g., no prior knowledge of the individual user's voice characteristics is recorded yet, the voice signal 51 from the individual user 11 is received at the user enrollment system 110. A voice features extraction module 112 extracts voice features from the received voice signal 51. Examples of voice features include Mel frequency cepstral coefficients (MFCCs), linear prediction cepstral coefficients (LPCC), perceptual linear predictive (PLP) cepstral coefficients, or the like. The speech signal may be divided into overlapping speech frames. For example, every 10 milli-seconds (msec), a speech frame of 25 msec duration is processed to extract a feature vector, e.g., including 40 coefficients. The extracted feature vectors are then used by the efficient i-vector extraction module 114 to extract an i-vector representative of the statistical voice characteristics of the individual user 11. In the following, a sequence of feature vectors extracted from the voice signal 51 of the individual user 11 is referred to as $\chi = x_1, x_2, \ldots, x_t$.

In a Gaussian Mixture Model-Universal Background Model (GMM-UBM) framework, a statistical background model is represented by a UBM super-vector m. The super-vector m is constructed, during a learning phase, using feature vectors extracted from speech signals associated with a plurality of potential speakers. The UBM super-vector m is a stack of C sub-vectors, e.g., $u_1, u_2, \ldots, u_C$, each with dimension equal to F. Each of the sub-vectors, e.g., $u_1, u_2, \ldots,$ or $u_C$, represents the mean of a corresponding Gaussian component, or mixture, in the GMM-UBM framework. An i-vector model constrains the GMM super-vector s, representing both the speaker and channel characteristics of a given speech signal or segment 51, to live in a single sub-space according to:

$$s = m + T \cdot w, \quad (1)$$

where T is a low-rank rectangular matrix with C×F rows and M columns. Note that C×F>M. The M columns of T are vectors spanning the variability space of GMM super-vectors with respect to the UBM super-vector m. The variability space of GMM super-vectors represents inter-speaker variability and intra-speaker variability. Inter-speaker variability relates to variations in voice characteristics between different speakers, whereas intra-speaker variability relates to variations in voice characteristics of a single speaker. The vector w, referred to as the i-vector, is a random vector of size M having a standard normal distribution. In typical speaker verification or identification system, users enroll in the system by providing samples their voice. During the enrollment procedure, a particular user may provide several utterances. Based on the recorded utterance(s), one or more i-vectors specific to the particular user are generated by the user enrollment system 110.

Figure 2:
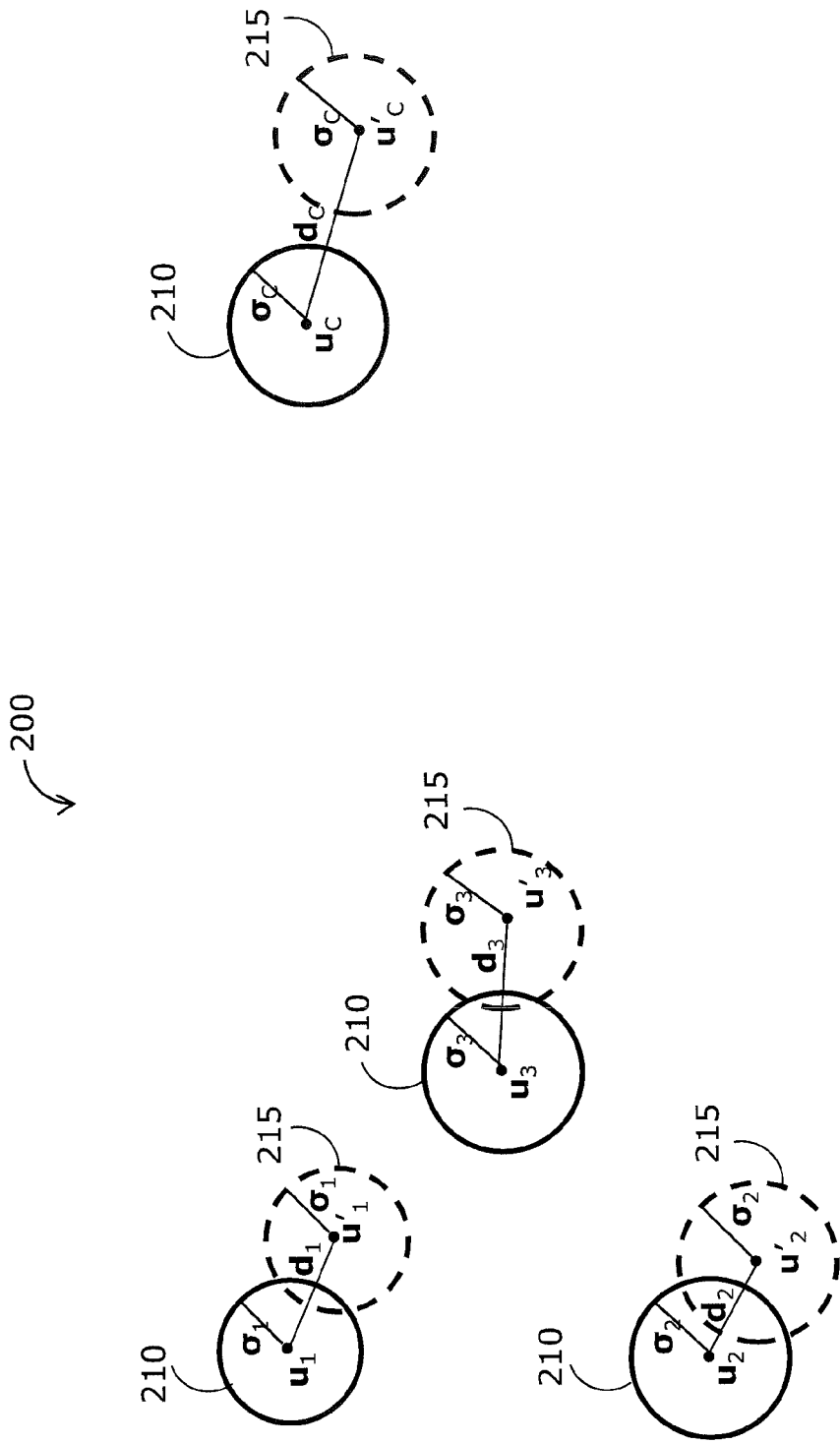
FIG. 2 is a graphical representation of Gaussian mixture model (GMM) components, or mixtures, illustrating statistical models representing training voice data and voice data associated with an individual user.

FIG. 2 is a graphical representation 200 of Gaussian mixture model (GMM) components, or mixtures, illustrating statistical models representing training voice data and voice data associated with an individual user 11. The GMM describes clusters of feature vectors in terms of Gaussian distributions. The statistical background model, or the universal background model (UBM), includes Gaussian distributions 210 describing cluster-distributions of feature vectors extracted from training voice data associated with a plurality of potential speakers. Each of the Gaussian distributions 210 is defined in terms of a mean vector, e.g., $u_1, u_2, \ldots,$ or $u_C$, and a covariance matrix, e.g., $\Sigma^{(1)}, \Sigma^{(2)}, \ldots,$ or $\Sigma^{(C)}$, represented in terms of a respective standard deviation vector, e.g., $[\sigma_{1,1} \, \sigma_{1,2} \ldots ], [\sigma_{2,1} \, \sigma_{2,2} \ldots ], \ldots,$ or $[\sigma_{C,1} \, \sigma_{C,2} \ldots ]$, where C represents the total number of components in the UBM framework. In FIG. 2, the standard deviation vectors are shown as bi-directional, however, each standard deviation vector may have a dimension larger than two. For example, during a training phase prior to the deployment of the user enrollment system 110, speech signals are collected and employed in calculating the statistical parameters of the UBM framework, e.g., $u_1, u_2, \ldots,$ and $u_C$, and a covariance matrix, e.g., $\Sigma^{(1)}, \Sigma^{(2)}, \ldots,$ or $\Sigma^{(C)}$. Alternatively, statistical parameters describing the UBM framework may be obtained from a third party.

According to at least one aspect, the user enrollment system 110 describes the distribution of the feature vectors of the individual user 11 in terms of the Gaussian distributions 215 defined in terms of the corresponding mean vectors $u'_1, u'_2, \ldots,$ and $u'_C$, and covariance matrices $\Sigma^{(1)}, \Sigma^{(2)}, \ldots,$ and $\Sigma^{(C)}$. The covariance matrices are assumed to be the same for both the statistical background model or UBM and the statistical model describing the distribution of feature vectors associated with the individual user 11. Such assumption simplifies the user enrollment procedure carried by the user enrollment system 110. However, according to at least one other aspect, the Gaussian distributions 215 in the statistical representation of the feature vectors of any individual user 11 may have standard deviation vectors different from those of the statistical background model.

The super-vector s is a stack of the mean vectors $u'_1, u'_2, \ldots,$ and $u'_C$ and the term T·w in equation (1) represents a vector stacking the vectors $d_1, d_2, d_3, \ldots, d_C$ shown in FIG. 2. In other words, the mean vectors $u'_1, u'_2, \ldots,$ and $u'_C$ of the Gaussian distributions associated with feature vectors of the individual user 11 are described in the i-vector framework in equation (1) in terms of their variation with respect to the mean vectors $u_1, u_2, \ldots,$ and $u_C$ associated with the statistical background model. As such, the user enrollment system 110 is configured to compute and store, for each individual user 11, the corresponding i-vector w.

Given the sequence of feature vectors $\chi = x_1, x_2, \ldots, x_t$ extracted from the speech segment 51 and the fact that the vector w has a normal distribution, the corresponding i-vector $w_\chi$ is computed as the mean of the posterior distribution $E[w/\chi]$:

$$w_\chi = L_\chi^{-1} T^* \Sigma^{-1} f_\chi, \qquad (2)$$

where $L_\chi^{-1}$ is the precision matrix of the posterior distribution and where the corresponding covariance matrix is defined as $$L_\chi = I + \Sigma_{c=1}^{C} N_\chi^{(c)} T^{(c)*} \Sigma^{(c)-1} T^{(c)}. \qquad (3)$$

In the equations (2) and (3), the parameter $N_\chi^{(c)}$ represents the zero-order statistic estimated on the c-th Gaussian component of the UBM observing the set of feature vectors in $\chi$. The matrix $\Sigma^{(c)-1}$ is the precision matrix of the UBM c-th component 210 and the matrix $\Sigma$ is the block diagonal matrix with $\Sigma^{(c)}$ as entries of diagonal blocks. The matrix $T^{(c)}$ is the F×M sub-matrix of T corresponding to the c-th GMM component 215. In other words, $T = (T^{(1)*}, \ldots, T^{(C)*})^*$. The term $f_\chi$ represents a super-vector stacking first-order statistics $f_\chi^{(c)}$, centered around the corresponding UBM means. That is $$N_\chi^{(c)} = \Sigma_{j=1}^{t} \gamma_j^{(c)} \qquad (4)$$

$$f_\chi^{(c)} = (\Sigma_{j=1}^{t} \gamma_j^{(c)} x_j) - N_\chi^{(c)} u^{(c)}, \qquad (5)$$

where $\gamma_j^{(c)}$ represents the probability of the feature vector $x_j$ occupying the c-th component 215 of the GMM.

Applying Cholesky decomposition to each UBM precision matrix $\Sigma^{(c)-1}$, the entities $f_\chi^{(c)}$ and $T^{(c)}$ are hereinafter normalized and re-defined as:

$$f_\chi^{(c)} \leftarrow \Sigma^{(c)-1/2} f_\chi^{(c)}$$

$$T^{(c)} \leftarrow \Sigma^{(c)-1/2} T^{(c)}. \qquad (6)$$

Using the normalized statistics and sub-matrices, the i-vector expression in equation (2) may be written as:

$$w_\chi = L_\chi^{-1} T^* f_\chi, \qquad (7)$$

with $$L_\chi = I + \Sigma_{c=1}^{C} N_\chi^{(c)} T^{(c)*} T^{(c)}. \qquad (8)$$

In extracting the i-vector $w_\chi$, equation (7) may be solved iteratively. Equation (7), may be written as:

$$L_\chi w_\chi = T^* f_\chi. \qquad (9)$$

Since the matrix $L_\chi$ is symmetric and positive definite, the linear system of equation (9) may be solved, for example, using the Conjugate Gradient (CG) method. Other iterative methods may be employed. By using an iterative approach, the computationally costly inversion of the matrix $L_\chi$ is avoided. However, even when employing iterative methods the computational cost as well as the memory store used is still relatively high. For example, the number of UBM and GMM components is about 1024, e.g., C=1024. The dimension of each of the sub-vectors $u_1, u_2, \ldots, u_C$ and $u'_1, u'_2, \ldots, u'_C$ is typically 40, e.g., F=40. The dimension of the i-vector may be M=400. As such, storing the matrix T, for example, would consume about 64 Mega Bytes (MB), whereas storing the UBM super-vector m would consume about 160 kilo Bytes (kB) assuming four bytes are used to represent each floating point number. In addition, the multiplication of the matrix $L_\chi$, T or T* with a vector, in the iterative approach, is computationally costly as it involves a huge number of multiplications. As such, the i-vector extraction procedure is computationally expensive and may be slow. A person skilled in the art should appreciate that the provided values for C, F and M represent example values and other values may be used. For example, the dimension of the i-vector M may be 300 or 500.

According to at least one aspect, an approximation of equation (8) is employed in order to reduce the computational cost and the memory usage of the i-vector extraction procedure. According to at least one embodiment, each of the matrices $T^{(c)}$ is approximated as $$\hat{T}^{(c)} \approx O^{(c)} \Pi^{(c)} Q, \qquad (10)$$

where the matrices $O^{(c)}$ and $\Pi^{(c)}$ specific to each matrix $T^{(c)}$, whereas the matrix Q is common to all matrices $T^{(c)}$ for c= 1, ..., C. According to at least one embodiment, the matrices $O^{(c)}$ are orthogonal whereas the matrices $\Pi^{(c)}$ are sparse, for example, with at most one non-null element per row.

According to at least one aspect, the approximation in equation (10) is obtained by minimizing the following objective function:

$$\min_{O^{(c)}, \Pi^{(c)}, Q} \Sigma_{c=1}^{C} \omega^{(c)} \| T^{(c)} - O^{(c)} \Pi^{(c)} Q \|^2, \qquad (11)$$

where each of the parameters $\omega^{(c)}$ is a weighting coefficient associated with the c-th component of the GMM. In a singular value decomposition of the matrix $T^{(c)}$, where $T^{(c)} = U^{(c)} S^{(c)} V^{(c)*}$ the matrix $S^{(c)}$ has a dimension F×M and the matrix $V^{(c)}$ has a dimension M×M. However, in the approximation in equation (10) each matrix $\Pi^{(c)}$ is virtually large with dimension equal to F×K, where K>M, but sparse, having at most one non-null element per row, and the matrix Q has a dimension equal to K×M. In other words, in equation (11) the value of K is selected to be larger than M.

In solving the optimization problem described by equation (11), an iterative approach may be employed where the matrices $\Pi^{(c)}$, $O^{(c)}$, and Q are updated one at a time. In other words, at each update operation, a first matrix, or set of matrices is/are updated while the others are treated as constants. Then a second matrix, or set of matrices, is/are updated while the others are treated as constants and so on. For example, in a first update operation, the matrices $\Pi^{(c)}$ are updated while the matrices $O^{(c)}$ and the matrix Q are kept as constants. In a second update operation, the set of matrices $O^{(c)}$ are updated while the matrix Q and the set of matrices $\Pi^{(c)}$ are treated as constants. That is, the derivative of the objective function in equation (11) with respect to the term $O^{(c)}$ is derived and the corresponding update is determined based on the derived derivative. Then, in a third update operation, the matrix Q is updated while the sets of matrices $\Pi^{(c)}$ and $O^{(c)}$ are treated as constants, for example, by using the derivative of the objective function in equation (11). In deriving the derivatives, the objective function in equation (11) may be re-written as:

$$\min_{O^{(c)}, \Pi^{(c)}, Q} \Sigma_{c=1}^{C} \omega^{(c)} [tr(T^{(c)*} T^{(c)}) + tr(Q^* D^{(c)} Q) - 2tr(T^{(c)*} O^{(c)} \Pi^{(c)} Q)]. \qquad (12)$$

Selecting K>M results in more degrees of freedom, e.g., more rows in the matrix Q, and therefore, a better approximation when solving equation (11). In other words, because the size of the matrix Q is not constrained to be M×M and the matrix $\Pi^{(c)}$ is sparse with at most one non-null element per row, the matrix Q may be viewed as a dictionary of K rows from which only M rows are used in approximating a corresponding matrix $T^{(c)}$. Thus, setting K>>M results in accurate estimation of the matrices $T^{(c)}$ for c=1, ..., C. Given that the matrix T is independent of any particular speaker or user 11, the approximation described in equations (10) and (11) may be computed offline, e.g., prior to the deployment of the user enrollment system 110 or the user authentication system 190.

Using the approximation in equation (10), the covariance matrix of the posterior distribution $L_\chi$ in equation (8) may be approximated as:

$$\hat{L}_\chi = I + \sum_{c=1}^{C} N_\chi^{(c)} Q^* \prod^{(c)*} O^{(c)*} O^{(c)} \prod^{(c)} Q \qquad (13)$$

$$= I + Q^* \sum_{c=1}^{C} N_\chi^{(c)} \prod^{(c)*} \prod^{(c)} Q.$$

By incorporating equation (10) in equation (9), the linear system may be described as:

$$\hat{L}_\chi \hat{w}_\chi = \hat{T}^* f_\chi \qquad (14)$$

$$= \sum_{c=1}^{C} T^{(c)*} f_\chi^{(c)}$$

$$= Q^* \sum_{c=1}^{C} \prod^{(c)*} O^{(c)*} f_\chi^{(c)}.$$

The matrix $\hat{L}_\chi$ is symmetric and positive definite, the linear system of equations (14) may be solved using the Conjugate Gradient (CG) method by iterating from an initial guess $w_0$, and generating successive vectors that are closer to the solution w that minimizes the quadratic function $$\phi(w) = \tfrac{1}{2} w^* \hat{L}_\chi w - w^* (Q^* \Sigma_{c=1}^{C} \prod^{(c)*} O^{(c)*} f_\chi^{(c)}). \qquad (15)$$

Since iteration updates in the CG method involve calculating $\hat{L}_\chi \hat{w}_n$, where n represents an iteration index, it is possible to reduce the memory storage and computational power used by using equation (13), to express $\hat{L}_\chi \hat{w}_n$ as:

$$\hat{L}_\chi \hat{w}_n = I \hat{w}_n + Q^* (\Sigma_{c=1}^{C} N_\chi^{(c)} \prod^{(c)*} \prod^{(c)}) Q \hat{w}_n. \qquad (16)$$

The right-side term of equation (16) may be computed according to the following sequence of operations:

$$Z = Q \hat{w}_n \qquad (17a)$$

$$Z \leftarrow (\Sigma_{c=1}^{C} N_\chi^{(c)} \prod^{(c)*} \prod^{(c)}) Z \qquad (17b)$$

$$Z \leftarrow Q^* Z \qquad (17c)$$

$$\hat{L}_\chi \hat{w}_n = Z + \hat{w}_n \qquad (17d)$$

The first operation of the sequence operations shown above produces a vector. In the second operation, the matrices $\prod^{(c)*} \prod^{(c)}$ are diagonal matrices and the term $N_\chi^{(c)}$ is a scalar. As such, the second operation may be implemented as scaling of the entries of the vector Z by the diagonal entries of the matrices $\prod^{(c)*} \prod^{(c)}$ or a combination thereof. The third operation is a matrix-vector multiplication. The conjugate gradient method may be pre-conditioned, by multiplying the residual by a fixed symmetric positive-definite matrix, to speed-up convergence. An example of a pre-condition matrix is:

$$\Gamma = (\Sigma_{c=1}^{C} N_\chi^{(c)} \mathrm{diag}(T^{(c)*} T^{(c)}) + I)^{-1}, \qquad (18)$$

where the diag operator generates a diagonal matrix with diagonal entries equal to those of the input matrix, e.g., $T^{(c)*} T^{(c)}$.

V. Matrix $T^{(c)}$ Approximation

The matrices $O^{(c)}$, $\Pi^{(c)}$, Q are obtained by minimizing the norm of the difference between $T^{(c)}$ and its approximation $\hat{T}^{(c)}$. In particular, the object function that we optimize is:

$$\min_{O^{(c)} \Pi^{(c)} Q} \sum_c \omega^c \left\| T^{(c)} - O^{(c)} \prod^{(c)} Q \right\|^2, \qquad (19)$$

Where $\omega^{(c)}$ is the weight of the c-th Gaussian in the UBM supervector.

The optimization is performed by iterating a sequence of partial optimizations where one of the three matrices is updated while keeping constant the others. In an example implementation, updating of the matrices is performed as:
  i. Update $\Pi^{(c)}$ using equations (25), while keeping Q and $O^{(c)}$ unmodified;
  ii. Update $O^{(c)}$ using equation (23), while keeping Q and $\Pi^{(c)}$ unmodified; and
  iii. Update Q using equation (21), while keeping $O^{(c)}$ and $\Pi^{(c)}$ unmodified The Objective function (19) may be re-written as:

$$\min_{O^{(c)} \Pi^{(c)} Q} \sum_c \omega^{(c)} [T^{(c)*} T^{(c)} + tr(Q^* D^{(c)} Q) - 2tr(T^{(c)*} O^{(c)} \prod^{(c)} Q)], \qquad (20)$$

where $D^{(c)} = \Pi^{(c)*} \Pi^{(c)}$ is a diagonal matrix. In solving for Q, the gradient of the expression in (20) is equated to zero while keeping fixed $O^{(c)}$ and $\Pi^{(c)}$:

$$\frac{\partial}{\partial Q} = \sum_c \left(2\omega^{(c)} D^{(c)} Q - 2\omega^{(c)} \prod^{(c)*} O^{(c)*} T^{(c)}\right) = 0 \qquad (21)$$

obtaining $$Q = \left(\sum_c \omega^{(c)} D^{(c)}\right)^{-1} \left(\sum_c \omega^{(c)} \prod^{(c)*} O^{(c)*} T^{(c)}\right).$$

It is worth noting that our training procedure may not guarantee the matrix Q is full rank, but we could make it full rank by stacking the actual dictionary matrix Q with a (full rank) M×M identity matrix whose rows are not re-estimated. However, we observed that in practice, even for small sized dictionaries, no particular care has to be taken to avoid deficient Q matrices.

Since the optimization of each $O^{(c)}$ may be done independently from the others, and the same applies to $\Pi^{(c)}$, factor $\omega^{(c)}$ in (20) may be ignored. Solving for of each $O^{(c)}$ may be done independently from the others, by maximizing the third term in (20) while keeping $\Pi^{(c)}$, and Q constant. That is:

$$\max_{O^{(c)}} tr\left(T^{(c)*} O^{(c)} \prod^{(c)} Q\right). \qquad (22)$$

The solution is:

$$O^{(c)} Vz Uz^* \qquad (23)$$

where Vz and Uz come from the Singular Value Decomposition of $Z = \Pi^{(c)} Q T^{(c)*}$, that is:

$$Z = Vz \Sigma z Uz^*.$$

Considering again (20), solving for each $\Pi^{(c)}$ may be done independently for any other each $\Pi^{(c)}$, while keeping $O^{(c)}$ and Q constant, such as:

$$\min_{\Pi^{(c)}} [tr(Q^* \prod^{(c)*} \prod^{(c)} Q) - 2tr(T^{(c)*} O^{(c)} \prod^{(c)} Q)] \quad (24)$$

This optimization finds for each row f of the matrix $\Pi^{(c)}$ the best row index $k_f^{(c)opt}$ in matrix Q and the corresponding non null element $\pi_f^{(c)}$ of row f in matrix $\Pi^{(c)}$. Defining $A^{(c)} = O^{(c)*}T^{(c)}Q^*$ and $q_k^2$ as the k-th element of the diagonal of Q*, the solution is:

$$k_f^{(c)opt} = \operatorname*{argmax}_k \frac{A_{f,k}^{(c)2}}{q_k^2} \quad \pi_f^{(c)} = \frac{A_{f,k^{opt}}^{(c)}}{q_{k^{opt}}^2} \quad (25)$$

Figure 3:
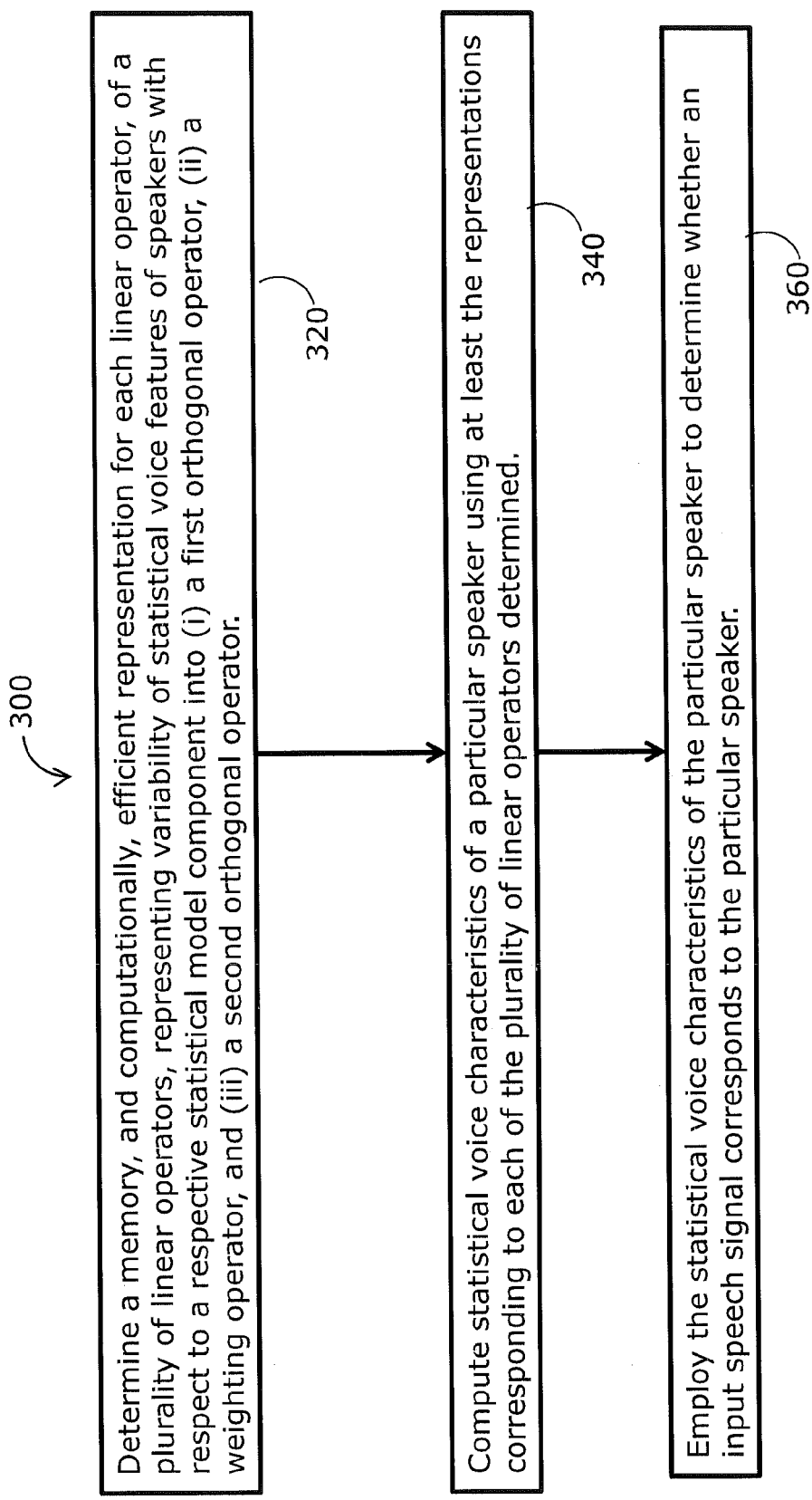
FIG. 3 is a flowchart illustrating a method according to at least one example embodiment.

FIG. 3 is a flowchart illustrating a method 300 according to at least one example embodiment. At block 320, for each of the linear operators representing variability of statistical voice features of speakers with respect to a respective statistical model component, e.g., $T^{(c)}$ for c=1, ..., C, a memory, and computationally, efficient representation is determined in terms of (i) a first orthogonal operator, (ii) a weighting operator, and (iii) a second linear operator. The first orthogonal operator and the weighting operator are both dependent on the respective linear operator for which a representation is determined. The second linear operator, however, is common to all linear operators associated with all components of the background statistical model. The second linear operator has a first dimension larger than a second dimension of each of the linear operators representing variability of statistical voice features of speakers with respect to a respective statistical model component. In other words, at block 320, the approximation described in equation (10) is computed by solving the optimization problem described in equation (11) or (12). The linear operators, for which representations are determined, may be normalized operators as described in equation (6). According to at least one aspect, an iterative method may be used to minimize the objective function in equation (11) or (12). However, a person skilled in the relevant art should appreciate that other analytical or numerical approaches known in the art may also be used to solve for equation (11) or (12).

The operation(s) described in block 320 relates to the matrix T and its corresponding sub-matrices $T^{(c)}$ but is independent of the voice features of any particular user 11. As such, the operation(s) of block 320 may be performed once, e.g., off-line prior to the deployment of the user enrollment system 110 or the user authentication system 190. Once the set of matrices $O^{(c)}$, the set of matrices $\Pi^{(c)}$, and the matrix Q are determined, only the matrix Q and representations of the set of matrices $O^{(c)}$ and $\Pi^{(c)}$ are stored, for example, in the database 150. The storage cost of the matrices $O^{(c)}$ is that of storing C×F×F floating point values. The storage cost of the matrix Q, is that of storing K×M floating point values. The set of matrices $\Pi^{(c)}$ are sparse with at most one non-zero entry per row, i.e., including at most F entries per single matrix $\Pi^{(c)}$. As such, the storage cost is that of storing C×F floating point values and C×F integer values for the whole set of sparse matrices Π(c). Using the approximation of equation (10), the $T^{(c)}$ matrices are no longer needed, saving a storage cost of C×F×M floating point values. Assuming floating point and integer representations on four bytes and assuming that C=2048, F=60, M=400, and selecting K such that K=5000, the memory usage to store the matrix Q, the matrices $O^{(c)}$ and representations of the sparse matrices $\Pi^{(c)}$ is in the order of 38 MB. This is compared to a memory requirement of 188 MB for a standard "slow" i-vector extraction implementation and 815 MB for a "fast" i-vector extraction approach.

At block 340, statistical voice characteristics associated with a particular user 11 are computed using at least in part the representations determined at block 320. In other words, an i-vector corresponding to the particular user 11 is computed, for example, by minimizing the objective function in equation (15). According to at least one aspect, the i-vector is computed by the user enrollment system or module 110. In computing the i-vector, a Conjugate Gradient method, a steepest descent method, or any other iterative or direct approach may be used. The determined i-vector is then stored in the database 150 in association with the respective particular user 11.

In minimizing the quadratic function in equation (15) to obtain an estimate of the i-vector, the computational complexity of the Conjugate Gradient approach is of order O(NKM), where N represents the number of iterations of the Conjugate Gradient approach. Usually, few iterations, e.g., less than or about 10 iterations, are performed by the Conjugate Gradient approach before convergence is achieved. According to a standard approach known in the art, the i-vector may be computed by solving equation (2). In such case the corresponding computational complexity is of order $O(CFM^2)$ which significantly larger than O(NKM). Another approach for i-vector extraction, known in the art, uses eigen decomposition of a weighted sum of the matrices $T^{(c)*}T^{(c)}$ to compute a diagonal approximation of the matrix $L_\chi$ that is then used to solve equation (2). Such approach does not provide an estimate of the i-vector as accurate as that provided by minimizing the quadratic function in equation (15) because it may be seen as a special case of our approximation, but constrained to use a fixed dimension (M×M) matrix Q, obtained by a completely different optimization process.

At block 360, the statistical voice characteristics of the particular user 11 are employed, for example, by the user authentication system 190 to determine whether a received speech signal 51 belongs to the particular user 11. Feature vectors may be extracted from the received speech signal 51 by the features extraction module 192. The speaker identification module 194 then uses the extracted feature vectors and the i-vector, stored in the database 150, corresponding to the particular user 11 to determine whether the received speech signal 51 belongs to the particular user 11. For example, a new i-vector is computed using the extracted feature vectors and the new i-vector is then scored by a classifier against one or more enrollment i-vectors stored in the database 150 during the enrollment phase. The new i-vector may be compared to a single enrollment i-vector specific to the particular user. Alternatively, the speaker identification module 194 may compare the new i-vector to a plurality of enrollment i-vectors corresponding to different users to determine to which user the received speech signal 51 belongs. The speaker identification module 194, for example, employs a classifier using generative models based on Probabilistic Linear Discriminant Analysis (PLDA), a discriminative classifier such as Support Vector Machines (SVM) or Logistic Regression, or any other classifier known in the art. The user authentication system 190 may further include an access control module 196 configured to grant a calling user 11 access to a requested service.

FIG. 4 is a table illustrating the results of a set of simulation experiments aiming at evaluating the performance of different approaches for i-vector extraction. The simulation experiments focus mainly on memory and computational costs associated with i-vector extraction and no effort was made to select the best combination of features, techniques, or training data that allow obtaining the best performance. In the simulation experiments, the different approaches for i-vector extraction are tested and the corresponding performance results are presented in the table of FIG. 4. The tested approaches include a "baseline" approach, a Variational Bayes, or "VB," approach, an eigen-decomposition approach, and the approach proposed above and described in FIG. 3. The "baseline" approach refers to solving equation (7) by calculating the precision matrix $L_\chi^{-1}$, which involves computing the matrix $L_\chi$ according to equation (8). In the simulation experiments, two versions of the "baseline" approach are tested, a "Fast baseline" according to which the matrices $T^{(c)}*T^{(c)}$ are computed offline and stored prior to deployment of the user enrollment system 110, and a "Slow baseline" method which includes computing the matrices $T^{(c)}*T^{(c)}$ when evaluating the matrix $L_\chi$ according to equation (8). In the Variational Bayes (VB) framework an i-vector is obtained by iterating the estimation of one sub-block of i-vector elements at a time, keeping fixed all the others. The stopping criterion is based on the difference between the L2-norm of the current estimated i-vector and the one computed in the previous iteration. The eigen-decomposition approach employs an eigen-decomposition of a weighted sum of the matrices $T^{(c)}*T^{(c)}$ to construct a diagonal approximation of the matrix $L_\chi$ that is then used in solving equation (7).

The data set used in simulation experiments is the female part of the tel-tel extended NIST 2010 evaluation trials data known in the art. When testing the different approaches listed in the table of FIG. 4, a system front-end based on cepstral features was employed for all approaches. The system front-end is configured to extract the voice features. Every 10 msec, a 25 msec frame, e.g., defined by a sliding Hamming window, is processed to extract 19 Mel frequency cepstral coefficients and a log-energy value of the frame, and a 20-dimensional feature vector is formed. The 20-dimensional feature vector is then subjected to mean and variance normalization over a three seconds sliding window. A 60-dimensional feature vector is then obtained by appending the delta and double delta coefficients computed over a window of five frames. A gender-independent UBM is trained and modeled using 2048 GMM components. A gender-independent T matrix is obtained using only the NIST SRE 04/05/06 datasets known in the art. The i-vector dimension is fixed to 400 for all the experiments.

A first speaker recognition/identification system tested is based on the Linear Discriminant Analysis-Within Class Covariance Normalization (LDA-WCCN) classifier, which performs intersession compensation by means of Linear Discriminant Analysis (LDA), where all the i-vectors of the same speaker are associated with the same class. LDA removes the nuisance directions from the i-vectors by reducing the i-vector dimensions, e.g., from 400 to 200. The speaker i-vectors are finally normalized according to Within Class Covariance Normalization (WCCN), and used for cosine distance scoring. The second system tested is based on Gaussian PLDA, which is known in the art. PLDA models are trained with full-rank channel factors, and 120-dimensions for the speaker factors. The LDA matrix, the WCCN transformations, and the PLDA models are trained, in the simulation experiments, using the previously mentioned NIST datasets, and additionally the Switchboard II, Phases 2 and 3, and Switchboard Cellular, Parts 1 and 2 datasets known in the art. The i-vectors are length-normalized for training and testing the PLDA models. The scores provided by both systems are not normalized as is known in art.

The table in FIG. 4 summarizes the performance of the evaluated approaches on the female part of the extended telephone condition in the NIST 2010 evaluation dataset. The speaker recognition/identification accuracy is given in terms of the error metric Equal Error Rate (EER) and the error metric Minimum Detection Cost Functions defined by the National Institute of Standards and Technology (NIST) for the 2008, i.e., minDCF08, and 2010, i.e., minDCF10, evaluation datasets. For the i-vector extraction techniques tested and listed in the table of FIG. 4, the accuracy of the PLDA system is significantly better than the LDA-WCCN cosine distance scoring approach.

In evaluating the computational complexity, a larger number of conversation segments are employed in order to obtain accurate evaluation of the different approaches tested. In particular, the computation times for the extraction of the i-vectors are evaluated for 1000 and 5000 utterances for a single thread/core and a multi-thread/core setting, respectively. A person skilled in the art should appreciate that the absolute times for i-vector extraction depend on different factors including computer architecture, cache size, implementation language, and optimized numerical routines used. As such, the relative computational complexity of an approach with respect to others may be more meaningful and informative than the absolute i-vector extraction times. In particular, the time ratio shown in the table allows appreciating the measured ratio of each approach with respect to the fast, but inaccurate, eigen-decomposition technique.

With regard to the performance of the baseline approach, corresponding to the standard i-vector extraction method by computing the matrix $L_\chi^{-1}$ in solving equation (7), the simulation results show that the "Fast baseline" approach is about 14 times faster than the corresponding "Slow baseline" approach. However, the "Slow baseline" approach consumes 188 MB for storing matrix T, whereas the "Fast baseline" approach consumes 4 times more memory to store the matrices $T^{(c)}*T^{(c)}$ in order to speed-up the computation of (8).

According to the simulation results shown in FIG. 4, the approximate i-vector extraction based on the eigen decomposition approach is significantly faster than the "Fast baseline" and "Slow baseline" approaches and consumes almost the same amount of memory of the "Slow baseline" approach. However, the corresponding accuracy in terms of speaker identification is lower than the baseline methods.

Four implementation scenarios for the Variational Bayes approach, referred to as VB 10-10, VB 20-10, VB 10-100, and VB 20-100 in the table of FIG. 4, are tested as part of the simulation experiments. The label VB b-t refers to setting the sub-block dimension to b, and the stopping threshold to t. The performance results of the Variational Bayes approach show accuracy values, or error values, almost similar to those of the "Slow baseline" and "Fast baseline" methods. The Variational Bayes approach with a tight convergence threshold value is approximately 1.2 to 2 times slower than the fast baseline approach, depending on the available number of concurrent threads. In terms of memory usage, the Variational Bayes approach uses only slightly more memory than the eigen-decomposition approach. The simulation results for the implementation scenario indicated as VB 20-100, indicate an i-vector extraction which is at worst 1.3 times slower when using a single thread, or core, but requires only ¼ of the memory used by the fast baseline, and is faster if multi-threading is exploited.

The i-vector extraction approach described in FIG. 3, also referred to as Factorized Sub-space Evaluation (FSE) approach, and employing Conjugate Gradient is tested with different parameters such as K=2000, 3500, 5000, or 10000. For the employed Conjugate Gradient method, the stopping criterion is defined in terms of a corresponding residual threshold with values equal to $10^{-2}$ or $10^{-1}$, respectively. The FSE approach is also tested with pre-conditioning, as shown in equation (18), and without. The combinations of the different scenarios, e.g., different parameters' values, result in 16 implementations that are tested and the corresponding results are shown in FIG. 4.

The simulation results show that the FSE approach is better in terms of accuracy and memory usage than the eigen-decomposition approach, which is the fastest among i-vector extraction techniques known in that art. In terms of accuracy, the FSE approach may reach an accuracy that is comparable to that of the baseline approach as the value of K increases. The FSE approach significantly reduces the memory cost of i-vector extraction, e.g., by about 20 times compared to the "Fast baseline" approach and by about 5 times or more compared to the other approaches. The FSE approach is faster than the standard method, and even faster than the eigen-decomposition approach especially for large UBM models, e.g., for large values of C and F.

Comparing the results obtained with and without pre-conditioning the Conjugate Gradient method, it is clear that pre-conditioning contributes only a small speed-up for large values of K, e.g., 5 k and 10 k. Since for small models pre-conditioning does not produce better accuracy and it also requires O(M) additional storage, pre-conditioning may be omitted. The small system implementations, e.g., FSE-2K, of the FSE approach perform surprisingly well, considering that about one fifth of the memory typically consumed by the eigen-decomposition approach is used while providing accuracy results similar to those provided by the baseline approach.

According to the simulation results shown in FIG. 4, the FSE approach described herein, provides an accurate and efficient approximation of the components $T^{(c)}$ of the variability matrix T, and thus of the terms $T^{(c)*}T^{(c)}$ that are employed for computing the precision matrix of the posterior distribution in equation (8). The use of a common dictionary, i.e., matrix Q, with a relatively large number of rows, e.g., larger than the dimension of the matrices $T^{(c)}$, results in significant reduction in memory usage and computational complexity while providing relatively accurate performance in terms of speaker identification.

A person skilled in the art should appreciate that the user enrollment system 110 or the user authentication system 190, employing i-vector extraction according to the FSE approach, may be deployed within a user or network device 21. In other words, given the reduction in memory usage and computational complexity achieved when using the FSE approach, an electronic device 21 may perform user enrollment or user authentication.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of speaker identification in a speaker identification system, comprising:

determining a representation for each first linear operator of a plurality of first linear operators, each first linear operator of the plurality of first linear operators being an approximation of a sub-matrix of a low-rank matrix T having C×F rows, of C Gaussian Mixture Model (GMM) components ×F feature dimensions, and M columns corresponding to M vectors spanning a total variability space, each sub-matrix corresponding to a c-th GMM component of the C GMM components, each first linear operator representing variability of statistical voice features with respect to a statistical model component among a plurality of statistical model components, in terms of (i) an orthogonal operator specific to the respective first linear operator of the plurality of first linear operators, (ii) a weighting operator specific to the respective first linear operator of the plurality of linear operators, wherein each respective weighting operator is a sparse matrix, and (iii) a second linear operator common to the plurality of first linear operators and having a first dimension K larger than a second dimension M of the plurality of first linear operators to maintain accuracy of the plurality of first linear operators while reducing a storage requirement for the low-rank matrix T to improve memory usage of the speaker identification system;

computing statistical voice characteristics of a particular speaker using at least the representations corresponding to each of the plurality of linear operators determined; and employing the statistical voice characteristics of the particular speaker to determine whether an input speech signal corresponds to the particular speaker.

2. A computer-implemented method according to claim 1, wherein each respective orthogonal operator is an orthogonal matrix and the second linear operator, common to the plurality of linear operators, is a matrix with the corresponding number of rows being larger than the number of columns of each linear operator of the plurality of linear operators.

3. A computer-implemented method according to claim 2, wherein the sparse matrix includes one non-zero entry per row.

4. A computer-implemented method according to claim 1 further comprising selecting the first dimension of the second linear operator.

5. A computer-implemented method according to claim 1, wherein the statistical model components are components of Gaussian Mixture Model (GMM).

6. A computer-implemented method according to claim 1 wherein determining a representation for each linear operator of the plurality of linear operators includes calculating iteratively the representation, the calculated representation approximating the respective linear operator.

7. A computer-implemented method according to claim 1, wherein computing statistical voice characteristics of the particular speaker includes solving iteratively for a vector representing the statistical voice characteristics of the particular speaker.

8. A computer-implemented method according to claim 1, wherein the variability of statistical voice features includes inter-speaker variability and intra-speaker variability.

9. A computer-implemented method according to claim 1, wherein each linear operator of the plurality of linear operators is a normalized linear operator.

10. A computer-implemented method according to claim 1, wherein employing the statistical voice characteristics of the particular speaker to determine whether an input speech signal corresponds to the particular speaker includes:

extracting statistical voice features from the input speech signal; and classifying the statistical features extracted using statistical model components specific to the particular speaker, the statistical model components specific to the particular speaker being computed using the plurality of statistical model components, each of the plurality of linear operators, and statistical voice characteristics of the particular speaker computed.

11. An apparatus for speaker identification, comprising:
at least one processor; and
at least one memory including computer code instructions stored thereon,
the at least one processor and the at least one memory, with the computer code instructions, being configured to cause the apparatus to at least:

determine a representation for each first linear operator of a plurality of first linear operators, each first linear operator of the plurality of first linear operators being an approximation of a sub-matrix of a low-rank matrix T having C×F rows, of C Gaussian Mixture Model (GMM) components ×F feature dimensions, and M columns corresponding to M vectors spanning a total variability space, each sub-matrix corresponding to a c-th GMM component of the C GMM components, each first linear operator representing variability of statistical voice features with respect to a statistical model component among a plurality of statistical model components, in terms of (i) an orthogonal operator specific to the respective first linear operator of the plurality of first linear operators, (ii) a weighting operator specific to the respective linear operator of the plurality of linear operators, wherein each respective weighting operator is a sparse matrix, and (iii) a second linear operator common to the plurality of first linear operators and having a first dimension K larger than a second dimension M of the plurality of first linear operators to maintain accuracy of the plurality of first linear operators while reducing a storage requirement for the low-rank matrix T to improve memory usage of the apparatus for speaker identification;

compute statistical voice characteristics of a particular speaker using at least the representations corresponding to each of the plurality of linear operators determined; and employ the statistical voice characteristics of the particular speaker to determine whether an input speech signal corresponds to the particular speaker.

12. An apparatus according to claim 11, wherein each respective orthogonal operator is an orthogonal matrix and the second linear operator, common to the plurality of linear operators, is a matrix with the corresponding number of rows being larger than the number of columns of each linear operator of the plurality of linear operators.

13. An apparatus according to claim 12, wherein the sparse matrix includes one non-zero entry per row.

14. An apparatus according to claim 11, wherein the at least one processor and the at least one memory, with the computer code instructions, are configured to cause the apparatus to further select the first dimension of the common linear operator.

15. An apparatus according to claim 11, wherein the statistical model components are components of a Gaussian Mixture Model (GMM).

16. An apparatus according to claim 11, wherein in determining a representation for each linear operator of the plurality of linear operators, the at least one processor and the at least one memory, with the computer code instructions, are configured to cause the apparatus to calculate iteratively the representation, the calculated representation approximating the respective linear operator.

17. An apparatus according to claim 11, wherein in computing statistical voice characteristics of the particular speaker, the at least one processor and the at least one memory, with the computer code instructions, are configured to cause the apparatus to solve iteratively for a vector representing the statistical voice characteristics of the particular speaker.

18. A computer-implemented method according to claim 11, wherein the variability of statistical voice features includes inter-speaker variability and intra-speaker variability.

19. An apparatus according to claim 11, wherein in employing the statistical voice characteristics of the particular speaker to determine whether an input speech signal corresponds to the particular speaker, the at least one processor and the at least one memory, with the computer code instructions, are configured to cause the apparatus to further perform at least the following:

extract statistical voice features from the input speech signal; and classify the statistical features extracted using statistical model components specific to the particular speaker, the statistical model components specific to the particular speaker being computed using the plurality of statistical model components, each of the plurality of linear operators, and statistical voice characteristics of the particular speaker computed.

20. A non-transitory computer-readable medium comprising computer code instructions stored thereon, the computer code instructions when executed by a processor cause an apparatus for speaker identification to perform at least the following:

determining a representation for each first linear operator of a plurality of linear operators, each first linear operator of the plurality of first linear operators being an approximation of a sub-matrix of a low-rank matrix T having $C \times F$ rows, of C Gaussian Mixture Model (GMM) components $\times F$ feature dimensions, and M columns corresponding to M vectors spanning a total variability space, each sub-matrix corresponding to a c-th GMM component of the C GMM components, each first linear operator representing variability of statistical voice features of speakers with respect to a statistical model component among a plurality of statistical model components, in terms of (i) an orthogonal operator specific to the respective first linear operator of the plurality of first linear operators, (ii) a weighting operator specific to the respective first linear operator of the plurality of first linear operators, wherein each respective weighting operator is a sparse matrix, and (iii) a second linear operator common to the plurality of first linear operators and having a first dimension K larger than a second dimension M of the plurality of first linear operators to maintain accuracy of the plurality of first linear operators while reducing a storage requirement for the low-rank matrix T to improve memory usage of the apparatus for speaker identification;

computing statistical voice characteristics of a particular speaker using at least the representations corresponding to each of the plurality of linear operators determined; and employing the statistical voice characteristics of the particular speaker to determine whether an input speech signal corresponds to the particular speaker.

\* \* \* \* \*